(12) United States Patent
Weirich

(10) Patent No.: US 6,690,122 B2
(45) Date of Patent: Feb. 10, 2004

(54) LAMP BALLAST WITH SEPIC CONVERTER

(75) Inventor: Michael Weirich, Unterhaching (DE)

(73) Assignee: Patent Treuhand Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/038,652

(22) Filed: Jan. 8, 2002

(65) Prior Publication Data

US 2002/0097011 A1 Jul. 25, 2002

(30) Foreign Application Priority Data

Jan. 24, 2001 (DE) .......................... 101 10 239

(51) Int. Cl.$^7$ ............................... G05F 1/00
(52) U.S. Cl. ................. 315/307; 315/360; 315/247; 315/225; 315/209 R
(58) Field of Search ............... 315/219, 225, 315/209 R, 247, 244, 224, 205, 291, 307, 360, 362, DIG. 4; 363/20, 21.01–21.05, 89, 97, 98; 323/222, 241, 282, 283

(56) References Cited

U.S. PATENT DOCUMENTS 5,391,976 A * 2/1995 Farrington et al. ......... 323/207
5,705,894 A    1/1998 Krummel .................... 315/119
6,181,079 B1 * 1/2001 Chang et al. ............... 315/247
6,304,473 B1 * 10/2001 Telefus et al. .............. 363/97
6,486,615 B2 * 11/2002 Hui et al. ................... 315/291

FOREIGN PATENT DOCUMENTS

WO          96/03017         7/1994

OTHER PUBLICATIONS

R. Antonia et al., Evaluation of Boost, Sepic And Cuk Topologies As Power Factor Correction Stage In Electronic Ballast Applications, IEEE Power Electronic Congress CIEP, Mexico, 1994, pp. 51–55. (Abstract and conclusion in English).

P. Horowitz, W. Hill, The Art of Electronics, Cambridge University Press, Cambridge, MA., USA, 1995, p. 901.

* cited by examiner

*Primary Examiner*—Haissa Philogene

(57) ABSTRACT

An electronic ballast for lamps, which has an input stage that is designed as a SEPIC converter. By operating the SEPIC converter in the mode with a discontinuous current profile, a slow microcontroller can be used for the control.

2 Claims, 1 Drawing Sheet

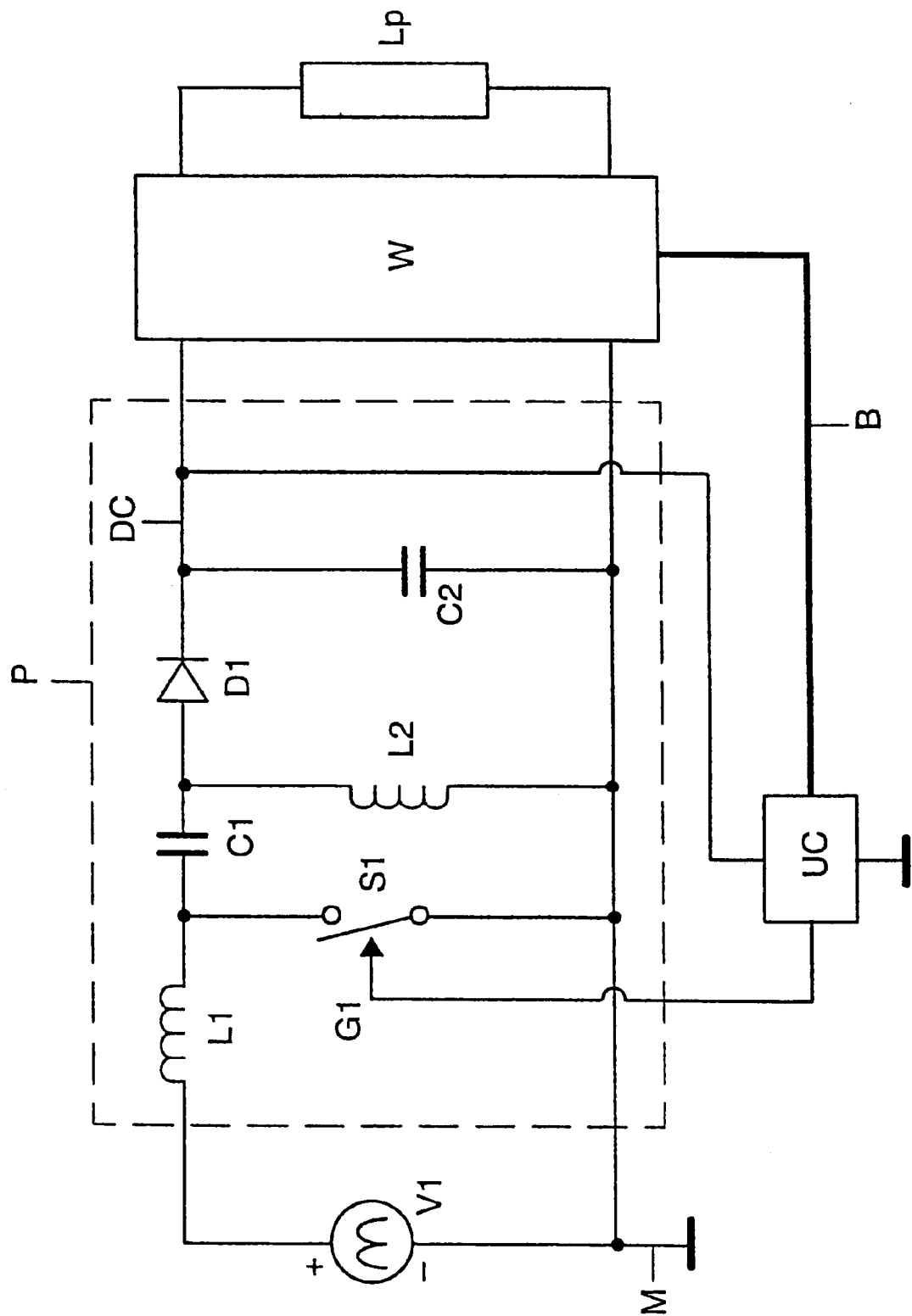

LAMP BALLAST WITH SEPIC CONVERTER

TECHNICAL FIELD

The invention is based on an electronic ballast according to the preamble of claim 1. In particular, it concerns the control design for an input stage of the electronic ballast.

PRIOR ART

The document WO96/03017 (Krummel) discloses an electronic ballast for the operation of lamps, which has a two-stage structure. An input stage is operated from the rectified mains voltage and provides a DC voltage. This DC voltage is used to operate an inverter, which generates a high-frequency (compared with the frequency of the mains voltage) AC voltage for the operation of lamps. The input stage has the following tasks: For reducing mains current harmonics to regulation (IEC 1000-3-2) values, it has to correct the power factor on the mains side. It also has to provide a DC voltage which is substantially independent of mains voltage fluctuations.

In said document, the input stage is designed as a step-up converter. This very widespread solution has the advantage that it makes good with few components and achieves quite high efficiencies. However, the input stage with a step-up converter has the following disadvantages: The DC voltage which is delivered is always greater than the maximum of the mains voltage; it generates strong RF interference; the starting current is high and the control needs a converter which either functions in analog mode or, if it functions in digital mode, has a sampling rate which is substantially higher than the mains frequency. The last disadvantage has the following background: The step-up converter is a switched-mode converter. That is to say, it has a switch whose duty ratio significantly affects the input current. The term "duty ratio" generally denotes the ratio of the time during which the switch is on to the time during which the switch is off. In order to achieve a high power factor, the duty ratio needs to be adjusted to the mains voltage.

Less widespread is the use of a so-called SEPIC converter in the input stage. It is described in the following document:

R. Antonio et al.: "EVALUATION OF BOOST, SEPIC AND CUK TOPOLOGIES AS POWER FACTOR CORRECTION STAGE IN ELECTRONIC BALLAST APPLICATIONS", IEEE Power Electronics Congress CIEP, Mexico, 1994. Although the SEPIC converter requires more components, the aforementioned disadvantages of the step-up converter can be avoided. In this case, the mode with a discontinuous current profile described in said document plays an important role: In this mode it is possible, with a constant duty ratio for the switches contained in the SEPIC converter, to achieve a power factor which leads to regulation mains current harmonics.

DESCRIPTION OF THE INVENTION

It is an object of the present invention to provide an electronic ballast according to the preamble of claim 1, which makes use of the advantages of the SEPIC converter in an inexpensive way.

This object is achieved, in the case of an electronic ballast having the features of the preambles of claim 1, by the features of the characterizing parts of claim 1. A particularly advantageous configuration is given in claim 2.

In order to control the output voltage and adjust the power factor of the SEPIC converter, an analog controller is used in said document. According to the invention, a digital controller is used to control the SEPIC converter. Further, the above-explained conditions for controlling the step-up converter which dominates the marketplace make it obvious that, when a digital controller is used, it must have a sampling procedure that can resolve the mains frequency. In this context, the term "analog controller" is intended to mean a controller which reads in and processes actual values, and outputs control values, as a continuous function of time. A digital controller functions as a discrete function of time. The actual values are sampled only at discrete points in time, between which there are sampling intervals. A new control value is likewise output at discrete points in time. This gives rise to control intervals within which the control value is constant. For the step-up converter, it has been found that the sampling and control intervals need to be shorter than 1% of the period of the mains frequency, in order to meet the requirements of said applicable regulations.

The invention uses the aforementioned property of a SEPIC converter that, in the mode with a discontinuous current profile, a sufficiently good power factor can be achieved with a constant duty ratio. The duty ratio is not adjusted to the instantaneous mains voltage, but instead merely the output voltage of the SEPIC converter is controlled. The output voltage need not be sampled at intervals which are shorter than 1% of the period of the mains frequency. According to the invention, the control intervals, i.e. the time during which the duty ratio is kept constant, are now at least as long as 1% of the period of the mains frequency. For a mains frequency of 50 Hz, for example, a control interval that is at least 0.2 ms long is hence obtained.

A commercially available microcontroller constitutes a flexible solution for implementing the controller according to the invention for the input stage of the electronic ballast. Since the invention requires only long sampling intervals (compared with the control of a step-up converter), an inexpensive microcontroller can be selected.

DESCRIPTION OF THE DRAWING

The invention will be explained in more detail with reference to an exemplary embodiment.

Capacitors are denoted below by letters C, inductors by L, diodes by D and switches by S, in each case followed by a number.

The FIGURE shows an electronic ballast with a lamp attached and an input stage according to the invention with control by a microcontroller.

The electronic ballast is supplied by a rectified mains voltage V1, which is joined by its negative terminal to the ground potential M. The series circuit consisting of an inductor L1 and a switch S1 is attached to the positive terminal of the rectified mains voltage V1. S1 is connected to the ground potential M. It is preferably designed as a semiconductor switch. The series circuit consisting of a capacitor C1 and an inductor L2 is attached to the connection point of L1 and S1. L2 is connected to the ground potential M. L1 and L2 may be coupled. This reduces the RF interference which is produced on the mains feed. The series circuit consisting of a diode DI and a capacitor C2 is attached to the connection point of C1 and L2. C2 is connected to the ground potential M. The boxed area P constitutes the input stage of the electronic ballast. It contains the components L1, L2, C1, C2, S1 and D1, which form a SEPIC converter. At C2, the SEPIC converter makes a DC voltage available, with which the inverter W can be supplied. The lamp Lp is attached to the output of the inverter W. The inverter W is preferably designed as a half-bridge inverter. It contains the coupling circuit for the lamp Lp.

In order to control the input stage P, a microcontroller UC is provided. It samples the output voltage of the input stage P from the potential DC and sends, to the control electrode G1 of the switch S1, a signal with a duty ratio that leads to a desired setpoint value for the DC voltage at the potential DC. According to the invention, the potential DC is sampled by the microcontroller at sampling intervals which are at least as long as 1% of the period of the mains frequency. Therefore, the control intervals are also at least as long as 1% of the period of the mains frequency., Between the microcontroller UC and the inverter W, there is the connecting line B. The microcontroller UC can hence also undertake control and regulating tasks for the inverter W. This is possible even with inexpensive microcontrollers UC, primarily since, according to the invention, the microcontroller UC needs to perform regulating tasks for the input stage P only at long sampling intervals.

The exemplary embodiment is equipped with only one lamp. The invention can, however, also be applied to applications with a plurality of lamps.

What is claimed is:

1. An electronic ballast for powering at least one lamp, comprising:

an input stage for receiving a rectified mains voltage and for providing a substantially direct current (DC) output voltage, the mains voltage having a mains frequency, wherein the input stage comprises:

(a) a SEPIC converter that is operated in a mode with a discontinuous current profile, the SEPIC converter including a semiconductor switch having a control electrode; and (b) a microcontroller for controlling the SEPIC converter, wherein the microcontroller is operable to; (i) sample the DC output voltage at sampling intervals that are at least as long as 1% of the period of the main frequency; and (ii) provide a signal to the control electrode of the semiconductor switch, the signal having a duty ratio that is varied in dependence on the sampled DC output voltage to provide a predetermined desired value for the DC Output voltage.

2. A method for controlling an input stage of an electronic ballast for powering at least one lamp, the method comprising the steps of:

providing a SEPIC convener for receiving a rectified mains voltage, wherein the mains voltage has a mains frequency:

operating the SEPIC convener in a mode with a discontinuous current profile, wherein the SEPIC converter is operated at a jury ratio; and varying the duty ratio of the SEPIC converter in time intervals that are at least as long as 1% of the period of the mains frequency.

* * * * *